(12) United States Patent
Suzuki

(10) Patent No.: US 6,642,676 B2
(45) Date of Patent: Nov. 4, 2003

(54) ELECTROMAGNETIC QUADRUPOLE CIRCUIT WHICH INDEPENDENTLY CORRECTS AC AND DC COMPONENTS OF CORRECTION CURRENT

(75) Inventor: Hitoshi Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/182,637

(22) PCT Filed: Nov. 30, 2001

(86) PCT No.: PCT/JP01/10516
§ 371 (c)(1),
(2), (4) Date: Jul. 22, 2002

(87) PCT Pub. No.: WO02/45411
PCT Pub. Date: Jun. 6, 2002

(65) Prior Publication Data
US 2003/0011329 A1 Jan. 16, 2003

(30) Foreign Application Priority Data
Nov. 30, 2000 (JP) ........................... 2000-369622

(51) Int. Cl.⁷ ................................. G09G 1/04
(52) U.S. Cl. .................. 315/370; 315/371; 315/368.12; 315/411; 315/408
(58) Field of Search ................ 315/1, 368.18, 315/368.21, 370, 371, 387, 397, 382, 382.1, 408, 411, 368.12

(56) References Cited

U.S. PATENT DOCUMENTS

| | | | | |
|---|---|---|---|---|
| 5,459,378 A | * | 10/1995 | Kato et al. | 315/382.1 |
| 5,712,532 A | * | 1/1998 | Ogino et al. | 315/1 |
| 6,285,142 B1 | * | 9/2001 | Kim | 315/371 |
| 6,424,104 B1 | * | 7/2002 | Bae et al. | 315/382 |

FOREIGN PATENT DOCUMENTS

| | | | |
|---|---|---|---|
| JP | 2-268078 | * | 4/1989 |
| JP | 3-139066 | * | 10/1989 |
| JP | 4-213969 | * | 12/1990 |
| JP | 5-130445 | * | 10/1991 |
| JP | 2000-253271 | * | 3/1999 |

* cited by examiner

Primary Examiner—Haissa Philogene
(74) Attorney, Agent, or Firm—Jay H. Maioli

(57) ABSTRACT

An electromagnetic quadrupole circuit capable of always performing the optimal correction of the spot form is provided with: a current detecting section 20 for detecting the peak value and bottom value of current flowing along an electromagnetic quadrupole coil 8; a control section 50 for supplying a prescribed peak control value and a prescribed bottom control value; a first power source 16 for controlling the feedback of the amount of supply current based on the peak value detected by the current detecting section 20 and the peak control value supplied from the control section 50; and a second power source 17 for controlling the feedback of the amount of supply current based on the bottom value detected by the current detecting section 20 and the bottom control value supplied from the control section 50.

6 Claims, 5 Drawing Sheets (A)

(B)

ELECTROMAGNETIC QUADRUPOLE CIRCUIT WHICH INDEPENDENTLY CORRECTS AC AND DC COMPONENTS OF CORRECTION CURRENT

TECHNICAL FIELD

The present invention relates to an electromagnetic quadrupole circuit, and is suitably applied to an electromagnetic quadrupole circuit for correcting the spot form of an electron beam in a cathode ray tube.

BACKGROUND ART

Referring to FIG. 7, in a conventional color CRT composed of a panel 2a, a funnel-shaped funnel part 2b, and a neck part 2c, the inside of the panel 2a is coated with three primary color stripe fluorescent material to be a fluorescent surface 3, and a color selection electrode or the like, not shown, is provided to irradiate a prescribed three primary color stripe of the fluorescent surface 3 with a three primary color beam.

An ungulate deflecting yoke 6 is provided on the outside around the border of the neck part 2c of a tube 2 and the funnel part 2b, an anode button AB is provided on the funnel part 2b to supply anode voltage, and the inside of the funnel part 2b is coated with a neck carbon CB to which the anode voltage is supplied.

An electron gun 5 is provided inside the neck part 2c of the tube 2, in which cathodes RK, GK, BK for R (red), G (green), B (blue), a first grid G1 and second grid composing a prefocus part, a third grid G3, fourth grid G4 and fifth grid G5 composing a main lens, and an electrostatic deflector 33 are sequentially arranged.

In such a CRT having the aforementioned arrangement, an electron beam 7 emitted from the three primary color cathodes RK, GK, BK toward the fluorescent surface of the panel 2a must form a circle beam spot with a small diameter on the screen of the fluorescent surface 3, however, a stigmatic distortion occurs in a beam spot due to uneven deflected magnetic field from the deflecting yoke and the like.

The diameter of the electron beam has a certain degree of deformation, and the electron beam spot is deformed by power which changes depending on a point. As a typical example, it is longitudinally long as shown in the center of FIG. 6.

In order to correct the form of the beam spot on this screen, an electromagnetic quadrupole coil is arranged on the neck of the fourth grid G4 at the center position of the main lens of the electron gun, and for example, a dynamic voltage of parabolic waveforms in synchronization with a horizontal deflection or vertical deflection, not shown, is applied to this electromagnetic quadrupole coil, thereby obtaining an even beam spot with a small diameter on the screen.

FIG. 4 shows an example of such an electromagnetic quadrupole circuit which applies a dynamic voltage in synchronization with a horizontal deflection. In this electromagnetic quadrupole circuit of FIG. 4, a first variable power source 3 is supplied to a series circuit of a diode 4 and a transistor 5 via a first choke coil 2.

In addition, a first capacitor 6 is connected in parallel to the series circuit of the diode 4 and transistor 5, a series circuit of a second capacitor 7 and electromagnetic quadrupole coil 8 is connected in parallel to the first capacitor 6, and a second variable power source 10 is supplied to the electromagnetic quadrupole coil 8 via the second choke coil 2.

A pulse in synchronization with the horizontal scanning frequency of the CRT shown in FIG. 5(A) is supplied to the base of the transistor 5 which thereby changes its state between ON and OFF.

When the transistor 5 is in an OFF state, the first capacitor 6, second capacitor 7 and electromagnetic quadrupole coil 8 forms a first resonance circuit having a high resonance frequency.

FIG. 5(B) shows a voltage waveform V1 of the first resonance circuit which is obtained at the connecting point of the first capacitor 6 and the second capacitor 7. The transistor 5 is arranged to drive before the resonance cycle finishes, the first capacitor 6 is shortened by the transistor 5 and diode 4 just when the next resonance cycle starts and the voltage exceeds the conducting voltage of the diode 4, and thereby the second capacitor 7 and electromagnetic quadrupole coil 8 form the second resonance circuit having a low resonance frequency. In this way, zero-volt switching is performed by the transistor 5 and the diode 4.

In the electromagnetic quadrupole circuit 1, the transistor 5 becomes to be in an ON or OFF state, in synchronization with the horizontal scanning frequency, thereby alternatively forming two resonance circuits having different resonance frequencies. As a result, the driving current i of a bathtub waveform in synchronization with the horizontal deflection as shown in FIG. 5(C) is supplied to the electromagnetic quadrupole coil 8.

FIG. 6 shows such an electromagnetic quadrupole coil 8 attached to the neck part 2c of the CRT, in which a coil 8C is wound onto each end of two yokes 8A and 8B arranged opposite each other. The spot of the electron beam is deformed by the magnetic field F which occurs by the quadrupole coil driving current i flowing along the coil 8C, so as to dynamically correct the focus.

In the electromagnetic quadrupole circuit 1 having such an arrangement, the first variable power source 3 mainly sets the alternating current of the quadrupole coil driving current i, that is, a peak•peak value ipp, and the second variable power source 10 controls the value of current which flows around the electromagnetic quadrupole coil 8 via the second coil 9, in order to mainly set the direct current of the quadrupole coil driving current i, that is, a bottom value ib.

These peak•peak value ipp and bottom value ib, however, can not be controlled independently. That is, when the voltage of the first variable power source 3 is changed to change the peak•peak value ipp, the bottom value ib is changed accordingly. In addition, when the voltage of the second variable power source 10 is changed to change the bottom value ib, the peak•peak value ipp is changed accordingly. This is the reason why the peak•peak value ipp and bottom value ib are difficult to set to be optimal values, which causes a problem in that the optimal correction of the spot form is difficult.

Further, in the electromagnetic quadrupole circuit 1 having such an arrangement, the value of the quadrupole coil driving current i is changed in accordance with the different features of the parts composing the circuit and the changes in features due to temperature, which causes a problem in that the optimal correction of the spot form is difficult.

SUMMARY OF THE INVENTION

The present invention has been made considering the above points, and intends to propose a simply constructed electromagnetic quadrupole circuit capable of reliably correcting the spot into an optimal form.

To solve the problems, the following are employed in the present invention: a switching means which becomes to be in an ON state during the horizontal scanning of a horizontal synchronization signal, the switching means having one control terminal connected to the high electric potential point and the other control terminal connected to the low electric potential point, and the control terminals receiving a driving signal in synchronization with the horizontal synchronization signal; a series circuit which resonates with a first resonance frequency during the horizontal scanning, the series circuit arranged in parallel to the two control terminals of the switching means, including a first resonance capacitor and an electromagnetic quadrupole coil connected in series; a second resonance capacitor which resonates with a second resonance frequency together with the first resonance capacitor and the electromagnetic quadrupole coil when the switching means in an OFF state, the second resonance capacitor arranged in parallel to the series circuit; a current detecting means for detecting the alternating current and direct current of current flowing along the electromagnetic quadrupole coil; a control means for supplying a prescribed alternating current control value and direct current control value; a first power supply means for supplying first voltage based on the alternating current detected by the current detecting means and the alternating current control value outputted from the control means, the first power supply means connected to one control terminal of the switching means; and a second power supply means for supplying second voltage based on the direct current detected by the current detecting means and the direct current control value outputted from the control means, the second power supply means connected to the connecting point of the first resonance capacitor and electromagnetic queadrupole coil of the series circuit.

The control means controls the alternating current control value and direct current control value so that the alternating current and direct current of current flowing along the electromagnetic quadrupole coil have prescribed values.

The alternating current and direct current of current flowing along the electromagnetic quadrupole coil are detected, the feedback of the amount of supply current from the first power source is controlled based on the alternating current and alternating current control value, and the feedback of the amount of supply current from the second power source is controlled based on the direct current and direct current control value, so that the driving current of the electromagnetic quadrupole coil can be controlled to have an optimal value, regardless of different features of parts composing the circuit and the change in features due to temperature, thus making it possible to always perform the optimal correction of the spot form.

BEST MODE FOR CARRYING OUT THE INVENTION

Figure 1:
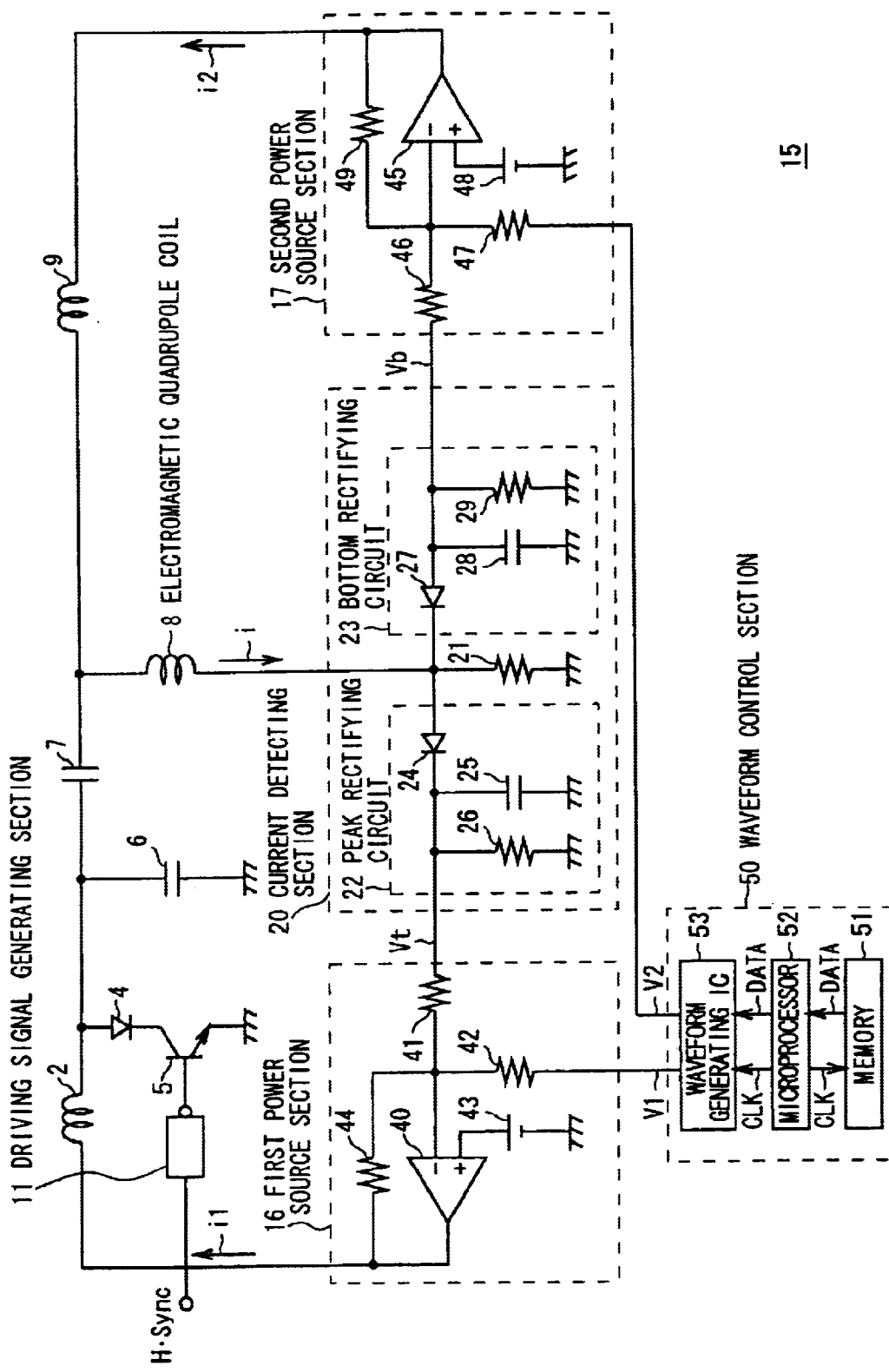
FIG. 1 is a circuit diagram showing an electromagnetic quadrupole circuit in the first embodiment of this invention.

Hereinafter, the first embodiment of the present invention will be explained in detail with reference to FIG. 1. It should be noted that the explanation on parts having the same reference numerals as parts of FIG. 4, in the electromagnetic quadrupole circuit is omitted.

Figure 4:
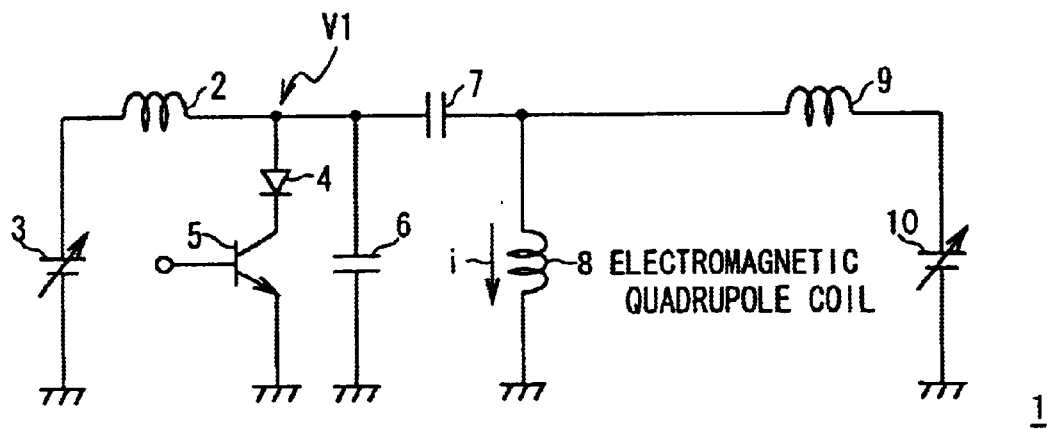
FIG. 4 is a circuit diagram showing a conventional electromagnetic quadrupole circuit.
Figure 5:
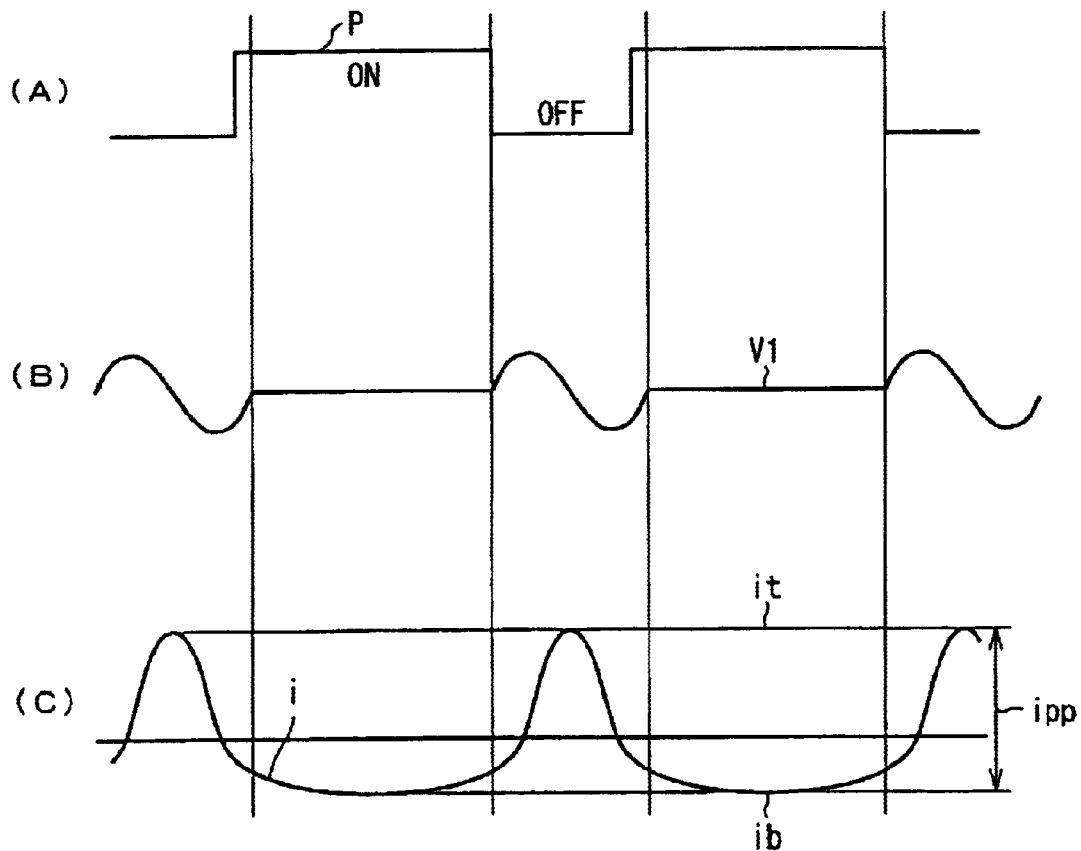
FIG. 5 is a waveform diagrams showing the waveforms of quadrupole coil driving current.
Figure 6:
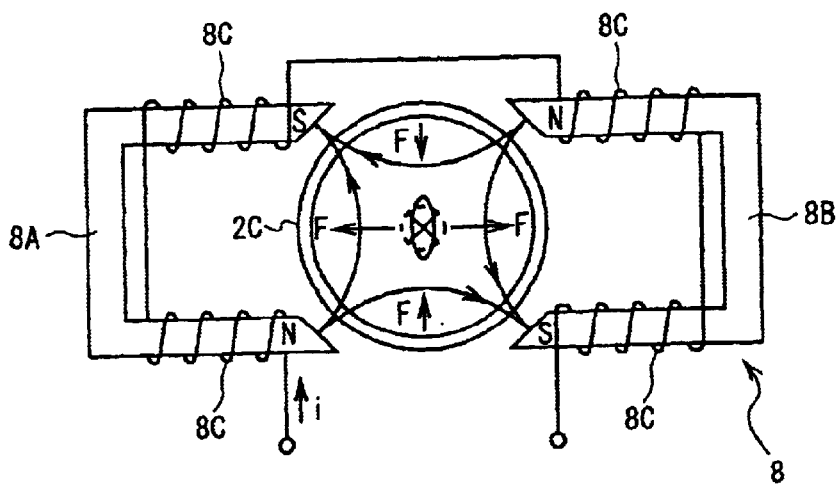
FIG. 6 is a schematic diagram showing the magnetic field occurred due to the conventional electromagnetic quadrupole coil and coil.
Figure 7:
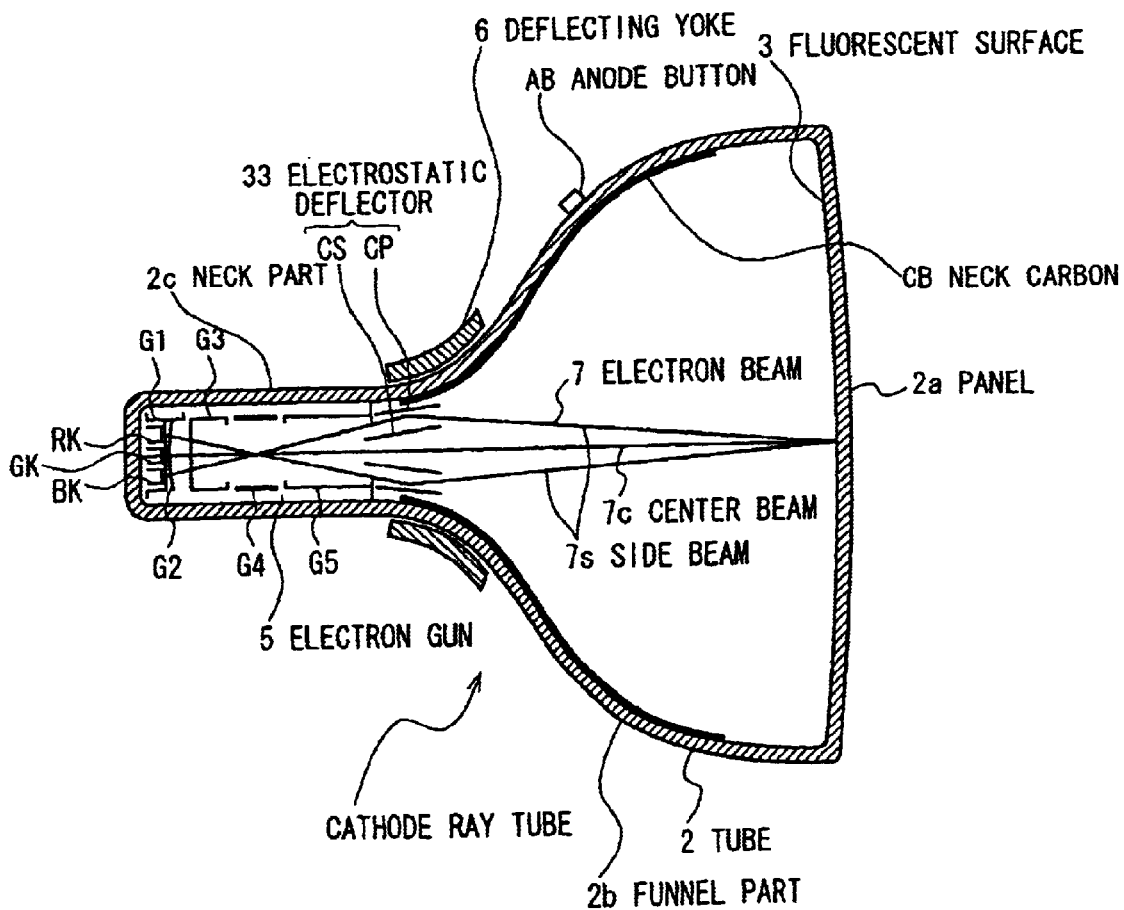
FIG. 7 is a diagram roughly explaining a video display device using a cathode ray tube in the conventional technology.

Referring to FIG. 1, reference numeral 15 shows an electromagnetic quadrupole circuit according to this invention, and has the same arrangement as FIG. 4 excepting that a first power source section 16 and a second power source section 17 are connected, in place of the first variable power source 3 and the second variable power source 10, and a current detecting section 20 is connected in series to the electromagnetic quadrupole coil 8.

In the current detecting section 20, a current detecting resistor 21 is connected in series to the electromagnetic quadrupole coil 8, and a peak rectifying circuit 22 and a bottom rectifying circuit 23 are connected at the middle point of connecting the electromagnetic quadrupole coil 8 and the current detecting resistor 21.

In the peak rectifying circuit 22, the anode of a diode 24 is connected at the midpoint between the electromagnetic quadrupole coil 8 and the current detecting resistor 21, and the cathode of the diode 24 is grounded via a capacitor 25 and a discharge resistor 26. The voltage V21 (FIG. 4(C)) created between both ends of the current detecting resistor 21 by the quadrupole coil driving current i is rectified by the diode 24 and charged to the capacitor 25, thereby the peal voltage Vt is generated by converting the peak value it of the quadrupole coil driving current i into voltage and supplied to the first power source section 16.

Likewise, in the bottom rectifying circuit 23, the cathode of a diode 27 is connected at the midpoint between the electromagnetic quadrupole coil 8 and the current detecting resistor 21, and the anode of the diode 27 is grounded via a capacitor 28 and a discharge resistor 29. The voltage V21 between both ends of the current detecting resistor 21 is rectified by the diode 27 and charged to the capacitor 28, thereby the bottom voltage Vb generated by converting the bottom value ib of the quadrupole coil driving current i into voltage and supplied to the second power source section 17.

In the first power source section 16, the inverted input terminal of an op-amp 40 is connected to the peak rectifying circuit 22 via a resistor 41 and also to a waveform control section 50 via a resistor 42, and the non-inverted input terminal is connected to a power source 43. Also, the output terminal of the op-amp 40 is connected to the first choke coil 2, and is connected back to the non-inverted input terminal via a resistor 44.

In addition, in the second power source section 17, the inverted input terminal of an op-amp 45 is connected to the bottom rectifying circuit 23 via a resistor 46, and to the waveform control section 50 via a resistor 47, and the non-inverted input terminal of the op-amp 45 is connected to a power source 48. Besides, the output terminal of the op-amp 45 is connected to the second choke coil 9, and is connected back to the inverted input terminal via a resistor 49.

Figure 2:
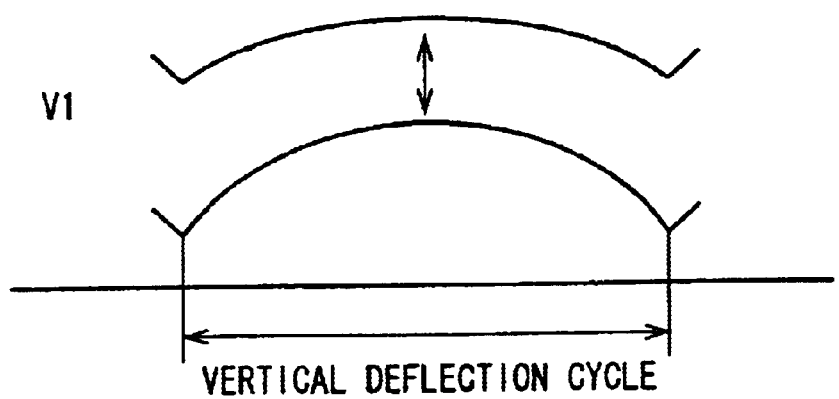
FIG. 2 is waveform diagrams showing the waveforms of voltage from a waveform control section.
Figure 2:
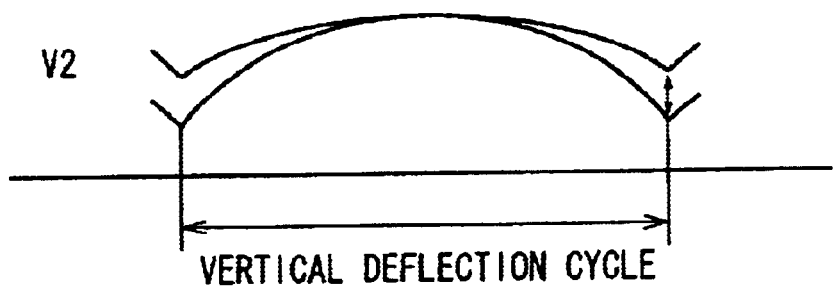

The waveform control section 50 generates the peak control voltage V1 and the bottom control voltage V2, which are supplied to the first power source section 16 and the second power source section 17, respectively. These peak control voltage V1 and the bottom control voltage V2 have parabola waveforms shown in FIG. 2(A) and FIG. 2(B), respectively.

The op-amp 40 of the first power source section 16 controls a first current value i1 based on the source voltage of the power source 43, the peak voltage Vt and the peak control voltage V1 so that the peak voltage Vt has a prescribed value corresponding to the peak control voltage V1. Likewise, the op-amp 45 of the second power source section 16 controls a second current value i2 based on the source voltage of the first power source 48, the bottom voltage Vb and the bottom control voltage V2 so that the bottom voltage Vb has a prescribed value corresponding to the bottom control voltage V2.

In this manner, in the electromagnetic quadrupole circuit 15, since the first power source section 16 and the second power source section 17 control the feedback of the first current value i1 and the second current value i2 based on the peak control voltage V1 and the bottom control voltage V2 respectively, the peak value and the bottom value of the quadrupole coil driving current I can be independently controlled by changing the peak control voltage V1 and the bottom control voltage V2 supplied from the waveform control section 50.

The waveform control section 50 is composed of a non-volatile memory 51, microprocessor 52, and a waveform generating IC 53. The microprocessor 52 retrieves correction data DATA stored in the non-volatile memory 51 based on the reference clock CLK, and supplies it to the waveform generating IC 53. Then, the waveform generating IC 53 generates the peak control voltage V1 and the bottom control voltage V2 based on the correction data DATA.

The non-volatile memory 51 stores as the correction data DATA the values of the peak control voltage V1 and the bottom control voltage V2 according to the quadrupole coil driving current i. Based on the correction data DATA, the peak control voltage V1 and the bottom control voltage V2 are generated, thereby the electromagnetic quadrupole circuit 15 can perform the optimal and suitable correction of the spot form on each point on the screen.

In the above structure, the electromagnetic quadrupole circuit 15 generates the peak voltage Vt and the bottom voltage Vb corresponding to the peak value it and the bottom value ib of the quadrupole coil driving current i by converting into voltage with the current detecting section 20 the quadrupole coil driving current i flowing along the electromagnetic quatrupole coil 8 by resonance, and supplies them to the corresponding first power source section 16 and second power source section 17 respectively.

Further, the waveform control section 50 generates the peak control voltage V1 and the bottom control voltage V2 based on the correction data DATA stored in the non-volatile memory 51, and supplies them to the corresponding first power source section 16 and second power source section 17 respectively.

Then, the op-amp 40 of the first power source section 16 controls the feedback of the first current i1 based on the peak voltage Vt and the peak control voltage V1 so that the peak voltage Vt has a prescribed value corresponding to the peak control voltage V1. Also, the op-amp 45 of the second power source section 17 controls the feedback of the second current i2 based on the bottom voltage Vb and the bottom control voltage V2 so that the bottom voltage Vb has a prescribed value corresponding to the bottom control voltage V2.

The second embodiment of this invention will be explained in detail with reference to FIG. 3. Note that, the explanation on parts having the same reference numerals as those of FIG. 1, in the electromagnetic quadrupole circuit 150 is omitted.

Figure 3:
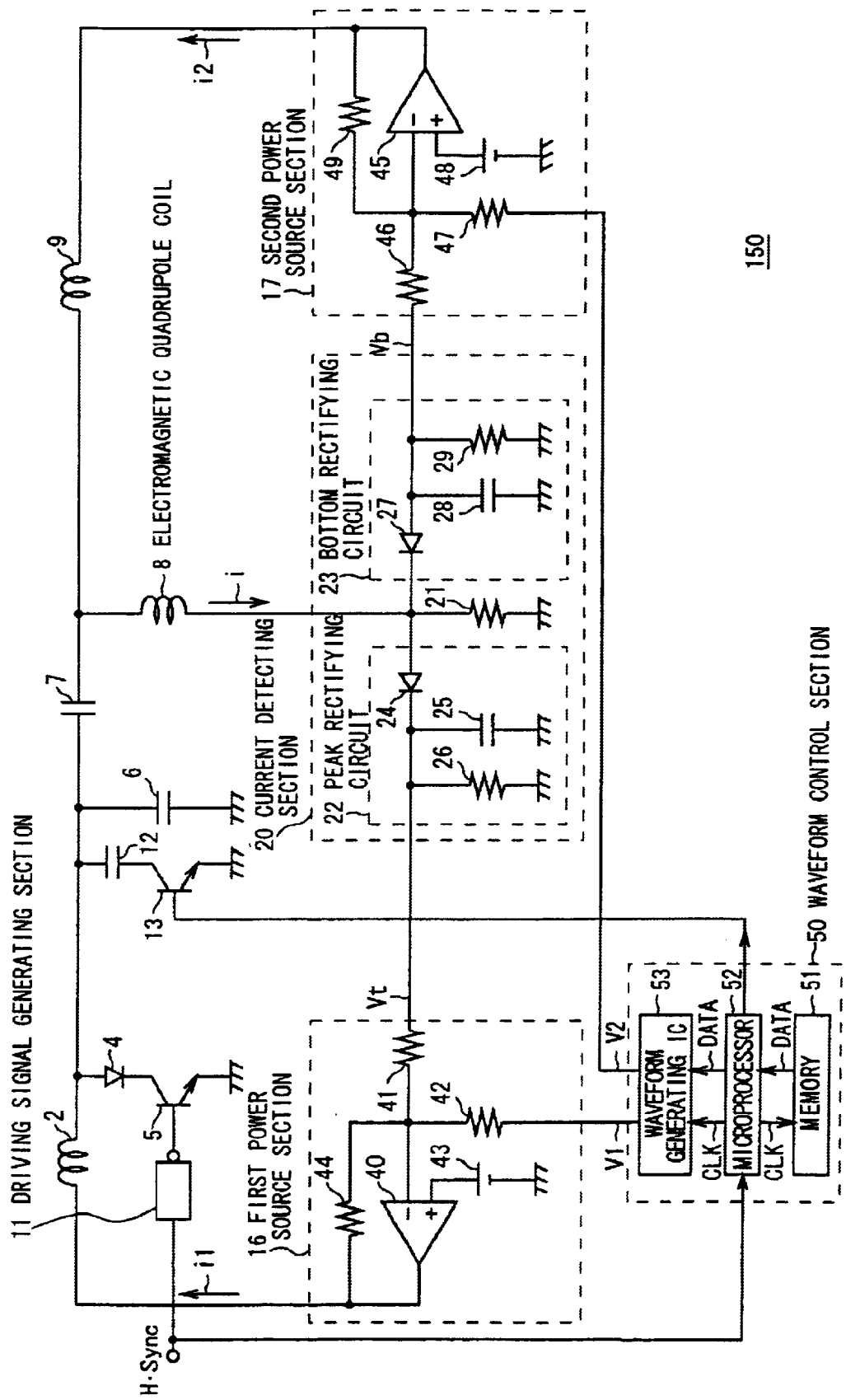
FIG. 3 is a circuit diagram showing an electromagnetic quadrupole circuit in the second embodiment of this invention.

Referring to FIG. 3, a horizontal synchronization signal is supplied to the microprocessor 52, and the series circuit comprising the microprocessor 52, the capacitor 12 and transistor 13 is connected in parallel to the first capacitor 6.

The microprocessor 52 detects the frequency of the horizontal synchronization signal, and when detecting a different horizontal frequency, it outputs a switching signal to the transistor 13. The transistor 13 conducts the switching signal, the capacitor 12 is thereby connected in series to the first capacitor 6, so as to change the resonance frequency of the second resonance circuit.

As described above, even in the case where the CRT is driven with a different horizontal frequency, the quadrupole coil driving current i is controlled to have an optimal value by changing the resonance frequency of the circuit.

Note that, in FIG. 3, the capacitor 12 is connected in parallel to the first capacitor 6, but may be connected in series to the first capacitor 6. In addition, it is no doubt that the capacitor 12 may be connected in series or in parallel to the second capacitor 7.

Industrial Utilization

The electromagnetic quadrupole circuit of the present invention is applied to a cathode ray tube, for example.

What is claimed is:

1. An electromagnetic quadrupole driving circuit comprising:
   first switching means giving a driving signal in synchronization with a horizontal synchronization signal, said first switching means being in an OFF state during a synchronization period and being in an ON state during a scanning period;
   a series circuit, provided in parallel to said first switching means, which resonates with a first resonance frequency by an electromagnetic quadrupole coil and a first resonance capacitor connected in series, while said first switching means is in the ON state;
   a second resonance capacitor, provided in parallel to the series circuit, which resonates with a second resonance frequency together with said first resonance capacitor and said electromagnetic quadupole coil when said switching means becomes to be in the OFF state;
   current detecting means for detecting the peak value and the bottom value of current flowing along said electromagnetic quadrupole coil;
   first power supply means for controlling an amplitude of current to be supplied to said electromagnetic quadrupole coil based on said peak value detected by said current detecting means; and
   second power supply means for controlling the superposed amount of current to be supplied to said electromagnetic quadrupole coil based on said bottom value detected by said current detecting means.

2. The electromagnetic quadrupole driving circuit according to claim 1 further comprising
   control means for supplying a prescribed alternating current control voltage to said first power supply means and supplying a prescribed direct current control voltage to said second power supply means, and wherein:

said first power supply means controls the amplitude of current to be supplied to said electromagnetic quadrupole coil based on said peak value and said alternating current control voltage supplied from said control means; and said second power supply means controls the superposed amount of current to be supplied to said electromagnetic quadrupole coil based on said bottom value and said direct current control voltage supplied from said control means.

3. The electromagnetic quadrupole driving circuit according to claim 2, wherein said control means supplies said alternating current control voltage and direct current control voltage in synchronization with a vertical scanning frequency.

4. The electromagnetic quadrupole driving circuit according to claim 3, wherein said control means comprises a memory for storing alternating current control data and direct current control data, a microprocessor for reading data out of the memory, and a waveform generating circuit for generating said alternating current control voltage and said direct current control voltage based on said alternating current control data and direct current control data read out by the microprocessor.

5. The electromagnetic quadrupole circuit according to claim 2, further comprising:

a series circuit comprising a third resonance capacitor and a second switching means said series circuit connected to said second resonance capacitor in parallel; wherein said control means detects the frequency of said driving signal, and controls so that said second switching means is in an ON state when detecting a second frequency different from a first frequency.

6. The electromagnetic quadrupole driving circuit according to claim 1 wherein:

said current detecting means has a voltage converting mens for converting current flowing along said electromagnetic quadrupole coil into voltage, alternating current detecting means for detecting the alternating current of the voltage obtained through the conversion by said voltage converting means, and direct current detecting means for detecting the direct current of the voltage obtained through the conversion by said voltage converting means;

said first power supply means has a first op-amp for controlling the amount of said current to be supplied, based on said peak value and said alternating current control voltage; and said second power supply means has a second op-amp for controlling the amount of said current to be supplied, based on said bottom value and said direct current control voltage.

* * * * *